US011794417B2

United States Patent
Smith et al.

(10) Patent No.: US 11,794,417 B2
(45) Date of Patent: Oct. 24, 2023

(54) POLYPHENYLENE SULFIDE POLYMER COMPOSITIONS AND CORRESPONDING LASER WELDING APPLICATIONS

(71) Applicant: SOLVAY SPECIALTY POLYMERS USA, LLC, Alpharetta, GA (US)

(72) Inventors: DeeDee Smith, Dacula, GA (US); Jiqiang Xia, Dublin, OH (US); William E. Sattich, Cumming, GA (US); Lee Carvell, Cumming, GA (US)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 0 days.

(21) Appl. No.: 17/286,632

(22) PCT Filed: Oct. 14, 2019

(86) PCT No.: PCT/EP2019/077710
§ 371 (c)(1),
(2) Date: Apr. 19, 2021

(87) PCT Pub. No.: WO2020/083683
PCT Pub. Date: Apr. 30, 2020

(65) Prior Publication Data
US 2021/0370614 A1 Dec. 2, 2021

Related U.S. Application Data

(60) Provisional application No. 62/748,614, filed on Oct. 22, 2018.

(51) Int. Cl.
*B29C 65/16* (2006.01)
*B29C 65/82* (2006.01)
*B29C 65/00* (2006.01)
*C08K 13/02* (2006.01)
*C08K 3/105* (2018.01)
*C08K 3/40* (2006.01)
*C08K 7/14* (2006.01)

(52) U.S. Cl.
CPC ...... *B29C 65/1616* (2013.01); *B29C 65/1635* (2013.01); *B29C 65/1677* (2013.01); *B29C 65/8215* (2013.01); *B29C 66/712* (2013.01); *B29C 66/7212* (2013.01); *B29C 66/72143* (2013.01); *B29C 66/7332* (2013.01); *C08K 13/02* (2013.01); *C08K 3/105* (2018.01); *C08K 3/40* (2013.01); *C08K 7/14* (2013.01); *C08K 2201/001* (2013.01)

(58) Field of Classification Search
CPC ............ B29C 65/1616; B29C 65/1635; B29C 65/1677; B29C 66/7212; C08K 3/105
See application file for complete search history.

(56) References Cited

U.S. PATENT DOCUMENTS

| 4,588,789 A * | 5/1986 | Scoggins ........... C08G 75/0295 |
| | | 528/388 |
| 5,266,680 A | 11/1993 | Reed |
| 2015/0175748 A1 | 6/2015 | Fodor et al. |
| 2017/0368762 A1 * | 12/2017 | Gautam ............. B29C 65/1635 |

FOREIGN PATENT DOCUMENTS

| EP | 1630201 A1 * | 3/2006 | ........ B29C 65/1635 |
| EP | 1630201 A1 | 3/2006 | |
| EP | 1847375 A1 | 10/2007 | |
| JP | 2007023263 A2 | 2/2007 | |
| JP | 2008019410 A2 | 1/2008 | |
| JP | 2009040808 A2 | 2/2009 | |
| JP | 2011127739 A2 | 6/2011 | |
| JP | 2016 069459 A2 | 5/2016 | |
| WO | WO-2006085643 A1 * | 8/2006 | ........ B29C 65/1635 |
| WO | WO-2013079383 A1 * | 6/2013 | ............... C08K 5/42 |

OTHER PUBLICATIONS

Murphy J., in "Additives for Plastics Handbook", 2nd Edition, 2001, Chapter 5.2.3., p. 43-48—Elsevier Advanced Technology.
Hausrath R.L. et al., in "Fiberglass and Glass Technology", 2010, XIV, Chapter 5, p. 197-225—Wallenberger F.T. and Bingham P.A. (Editors).

* cited by examiner

*Primary Examiner* — Daniel McNally
(74) *Attorney, Agent, or Firm* — Osha Bergman Watanabe & Burton LLP

(57) ABSTRACT

Described herein are polyphenylene sulfide ("PPS") polymers having excellent transparency to infrared ("IR") radiation. It was surprisingly discovered that PPS polymer composition including PPS polymers having a selected metal ion (Ca, K, and Mg) concentration at least 400 parts per million by weight ("ppm"), had significantly increase IR transparency, relative to corresponding PPS polymer compositions including a PPS polymer having a selected metal ion concentration less than 400 ppm. Additionally, described herein are methods for laser welding the PPS polymer compositions.

12 Claims, No Drawings

US 11,794,417 B2

POLYPHENYLENE SULFIDE POLYMER COMPOSITIONS AND CORRESPONDING LASER WELDING APPLICATIONS

CROSS REFERENCE TO RELATED APPLICATIONS

This application is a U.S. national stage entry under 35 U.S.C. § 371 of international patent application No. PCT/EP2019/077710, filed on Oct. 14, 2019, which claims priority to U.S. provisional patent application No. 62/748,614, filed on Oct. 22, 2018, the whole content of which is incorporated herein by reference for all purposes.

FIELD OF THE INVENTION

The invention relates to polyphenylene sulfide ("PPS") polymer compositions for laser welding applications. The invention further relates to methods for laser welding the PPS polymer compositions.

BACKGROUND OF THE INVENTION

In recent years many fabrication methods have been designed to form complicated shapes of polymer compositions. However, there are certain limitations to these existing methods. Many fabrication methods rely on adhesives for their sealing properties, but these are time-consuming and costly, and pose environmental concerns due to the use of volatile solvents. Ultrasonic welding or spin welding suffer from limitations on the shape and size of the objects bonded together, and occasionally show insufficient bonding strength. Vibration welding is often unattractive due to the inability to effectively control product appearance and flash, thereby limiting usage to certain applications.

Hence, the laser welding is increasingly attractive as a method to better cope with these drawbacks. Several important laser welding methods rely on Nd:YAG lasers (or known simply as YAG lasers) or diode lasers as the laser beam source, and these lasers emit light in the near infrared region. The diode laser techniques have become particularly advanced in recent years and diode lasers with higher output power can be obtained at lower cost.

To date, polyphthalamide ("PPA") polymer have enjoyed widespread use in application settings where laser weldable polymer compositions are desired. However, in applications settings where high chemical resistance and thermo-oxidative resistance is desired (e.g. under the hood automotive applications), the use of PPA is a compromise. In particular, although other polymer compositions have superior chemical resistance and thermo-oxidative resistance relative to PPA polymer, such polymer compositions do not have sufficient transparency to IR radiation to produce desirably strong joints when laser welded. Accordingly, the use of PPA in laser welding is a reflection for the compromise for improved joint strength over material performance.

SUMMARY OF INVENTION

In a first aspect, the invention relates to a method of laser welding an interface to form a joint, the method including irradiating a polymer-polymer interface with an infrared ("IR") light beam, where the polymer-polymer interface includes a polyphenylene sulfide ("PPS") polymer composition in contact with a second polymer composition; the PPS polymer composition includes a metal cation selected from the group consisting of Al, Ba, Ca, K, Mg and any combination of one or more thereof, preferably Ca, K and Mg and any combination of one or more thereof; the concentration of the metal cation is at least 400 ppm; and the irradiating forms a joint comprising the PPS polymer composition and the second polymer composition.

In some embodiments, the IR light beam comprises light at a wavelength of from 900 nm to 1000 nm. In some embodiments, the PPS polymer composition has a selected metal cation concentration of no more than 1,000 ppm. In some embodiments, the metal cation is Ca. The PPS polymer composition can include at least 5 wt. %, preferably at least 15 wt. %, more preferably at least 20 wt. %, most preferably at least 25 wt. % of a flat glass fiber.

In some embodiments, the IR light beam passes through the PPS polymer composition prior to irradiating the polymer-polymer interface. The PPS polymer composition can include an infrared ("IR") transparent dye and, in some such embodiments, the IR transparent dye is a black organic dye. In some embodiments, the IR light beam passes through the second polymer composition prior to irradiating the polymer-polymer interface and the PPS polymer composition comprises an IR absorbing dye. In some such embodiments, the IR absorbing dye is a black organic dye.

In some embodiments, the second polymer composition is a second PPS polymer composition. The second PPS polymer compositions can include a second metal cation selected from the group consisting Al, Ba, Ca, K, Mg and any combination of one or more thereof, preferably Ca, K and Mg and any combination of one or more thereof, and an IR transparent dye, where the concentration of the second metal cation is at least 400 ppm. In some embodiments, the PPS polymer composition is free of an organic dye. In some embodiments, the second polymer composition the second PPS polymer composition includes a polymer selected from the group consisting of acrylonitrile butadiene styrene, polyamide, polybutylene terephthalate, polycarbonate, polyethylene (high density and low density), poly(ether ether ketone), poly(ether sulfone), polyoxymethylene, polytetrafluoroethylene, and thermoplastic elastomer.

In some embodiments, an article is formed by the aforementioned methods. In some such embodiments, the article is an automotive component, a mobile electronic device component, an aerospace component, a filter components (e.g. fabrics), an electrical insulation components, a membrane components, or a gasket component.

In a second aspect, the invention is directed to a PPS polymer composition including a PPS polymer having a metal cation selected from the group consisting of Al, Ba, Ca, K, Mg and any combination of one or more thereof, preferably Ca, K and Mg and any combination of one or more thereof; at least 25 wt. % of a flat glass fiber; and an IR transparent dye or an IR absorbing dye, preferably an IR transparent dye; and where the concentration of the metal cation is at least 400 ppm and no more than 1000 ppm.

DETAILED DESCRIPTION OF THE INVENTION

Described herein are polyphenylene sulfide ("PPS") polymers having excellent transparency to infrared ("IR") radiation. It was surprisingly discovered that PPS polymer composition including PPS polymers having a selected metal ion (Al, Ba, Ca, K, or Mg) concentration of at least 400 parts per million by weight ("ppm"), had significantly increase IR transparency, relative to corresponding PPS polymer compositions including a PPS polymer having a selected metal ion concentration less than 400 ppm. Additionally described herein are methods for laser welding the PPS polymer compositions.

Laser welding involves the use of an IR light beam to create an adhesive joint between two polymer substrates. As used herein, IR light refers to light having a wavelength ranging from 800 nm to 1 mm. In laser welding, as described in more detail below, an IR light beam irradiates a polymer-polymer interface where two polymer compositions are in contact. At the interface, the polymers melt and re-solidify, creating a joint including a blend of both polymers.

Due to the excellent chemical resistance and thermo-oxidative stability of PPS, there is a strong desire to develop PPS polymer compositions that can be effectively laser welded. For example, currently polyphthalamide ("PPA") polymer compositions are used in laser welding application in place of PPS polymer compositions. While PPS polymer compositions provide significantly improved chemical resistance and thermo-oxidative heat resistance relative to PPA, the increased crystallinity of PPS polymer compositions (about 40% to 50%) relative to PPA (about 20% to 30%) leads to poor IR transmission through the PPS polymer composition relative to PPA polymer compositions (crystallinity can be measured using X-ray diffraction). Accordingly, in application settings where increased chemical resistance and thermo-oxidative heat resistance are important (e.g. under the hood automotive applications and mobile electronic device applications), PPA polymer compositions are still being used because of the inability to weld PPS polymer compositions having joints with desirable strength.

It was surprisingly discovered that polymer substrates including PPS polymer compositions including a PPS polymer having a selected metal cation concentration of at least 400 ppm had significantly improved IR transmittance, relative to corresponding PPS polymer compositions having a selected metal cation concentration of less than 400 ppm. As used herein, selected metal cation refers to metal cations selected from the group consisting of Al, Ba, Ca, K, and Mg and any combination of one or more thereof. Preferably, the selected metal cations are selected from Ca, K and Mg. Excellent results were achieved when the selected metal cation was Ca, as demonstrated in the Examples.

The Polyphenylene Sulfide Polymer

The PPS polymer has, relative to the total number of recurring units in the PPS polymer, at least 50 mol % of a recurring unit $R_{PPS}$ represented by the following formula:

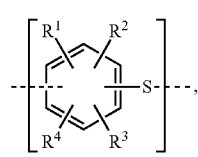

(1)

where $R^1$ to $R^4$ are independently selected from the group consisting of from the group consisting of a hydrogen, an alkyl, an aryl, an alkoxy, an aryloxy, an alkylketone, an arylketone, a fluoroalkyl, a fluoroaryl, a bromoalkyl, a bromoaryl, a chloroalkyl, a chloroaryl, an alkylsulfone, an arylsulfone, an alkylamide, an arylamide, an alkylester, an arylester, a fluorine, a chlorine, and a bromine. Preferably $R^1$ to $R^4$ are all hydrogen. As used herein, a dashed bond ("---") represents a bond to an atom outside the drawn structure (e.g. a bond to a recurring unit $R_{PPS}$ or another recurring unit). In some embodiments, the PPS polymer includes at least 60 mol %, at least 70 mol %, at least 80 mol %, at least 90 mol %, at least 95 mol %, at least 99 mol %, or at least 99.9 mol % of recurring unit $R_{PPS}$, relative to the total number of recurring units in the PPS polymer.

In some embodiments, recurring unit $R_{PPS}$ is represented by the following formula:

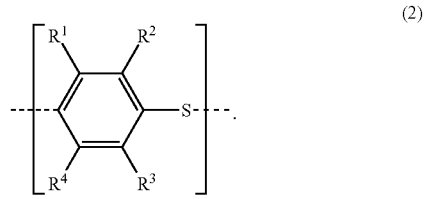

(2)

In some such embodiments, $R^1$ to $R^4$ are all hydrogen.

The PPS polymer has a selected metal cation concentration of at least 400 ppm. As demonstrated in the examples below, it was surprisingly discovered that PPS polymer compositions including a PPS polymer having a selected metal cation concentration of at least 400 ppm had significantly improved IR transparence, relative to corresponding PPS polymer compositions including a PPS polymer having a selected metal cation concentration of less than 400 ppm. In some embodiments, the PPS polymer has a selected metal cation concentration of at least 450 ppm, at least 500 ppm, at least 550 ppm or at least 600 ppm. Additionally or alternatively, in some embodiments, the PPS polymer has a selected metal cation concentration of no more than 1,000 ppm. In some embodiments, the PPS polymer has a selected metal cation concentration of from 400 ppm to 1,000 ppm, from 450 ppm to 1,000 ppm, from 500 ppm to 1,000 ppm, or from 550 ppm to 1,000 ppm. The selected metal ion concentration can be measured as described in the example below.

In some embodiments, the PPS polymer has a melt flow rate of 10 g/10 min. to 1000 g/10 min., from 20 g/10 min. to 500 g/10 min., or from 30 g/10 min. to 200 g/10 min. Melt flow rate can be measured according to ASTM D1238, Procedure B, at 316° C. and 5 kg.

Synthesis of Polyphenylene Sulfide Polymers

PPS polymer synthesis is well known in the art, and includes a polymerization process and a subsequent recovery process. The polymerization process includes a polymerization reaction, in which a para-dihalobenzene compound and sulfur compound are polymerized to form the PPS polymer, and a termination, in which the polymerization reaction is stopped. In general, the recovery process is used to tune the characteristics of the synthesized PPS polymer as well as to remove solvent, unreacted reaction components and polymerization by-products (including, but not limited to, low molecular weight PPS polymer and salts). The recovery process includes at least one post-reaction treatment where the PPS polymer formed during polymerization is contacted with a liquid ("treatment liquid"). In some embodiments, the selected metal cation and corresponding concentration in the PPS polymer is obtained during the recover process by, for example, incorporating the selected metal cation in the treatment liquid.

The polymerization process includes a polymerization reaction and a termination. The polymerization reaction includes contacting a para-dihalobenzene compound and a sulfur compound in the presence of a polymerization solvent (collectively, "reaction components") to form the PPS polymer. In some embodiments, the reaction components further include a molecular weight modifying agent. The para-dihalobenzene compound is represented by the following formula:

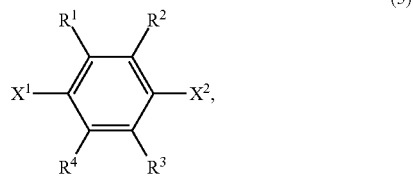

(5)

where $X^1$ and $X^2$ are independently selected from the group of halogens consisting of F, Cl, Br, I and At. In some embodiments, $X^1$ and $X^2$ are the same. In some embodiments, $R^1$ to $R^4$ are all hydrogen. Examples of desirable para-dihalobenzene compounds include, but are not limited to, p-dichlorobenzene ("P-DCB"), p-dibromobenzene, p-diiodobenzene, 1-chloro-4-bromobenzene, and 1-chloro-4-iodobenzene. In some embodiments, the reaction componenets can include a plurality of distinct para-dihalobenzene compounds according to Formula (5).

The sulfur compound is selected from the group consisting of thiosulfates, thioureas, thioamides, elemental sulfur, thiocarbamates, metal disulfides and oxysulfides, thiocarbonates, organic mercaptans, organic mercaptides, organic sulfides, alkali metal sulfides and bisulfides, and hydrogen sulfide. Preferably, the sulfur compound is an alkali metal sulfide. In some embodiments, the alkali metal sulfide is generated in situ from an alkali metal hydrosulfide and an alkali metal hydroxide. For example, $Na_2S$ is a particularly desirable alkali metal sulfide. $Na_2S$ can be generated in situ from NaSH and NaOH.

The polymerization solvent is selected such that it is a solvent for the para-dihalobenzene compound, the sulfur compound and the synthesized PPS, at the reaction temperature (discussed below). In some embodiments, the polymerization solvent is a polar aprotic solvent. Examples of desirable polar aprotic solvents include, but are not limited to, hexamethylphosphoramide, tetramethylurea, n,n-ethylenedipyrrolidone, n-methyl-2-pyrrolidone ("NMP"), pyrrolidone, caprolactam, n-ethylcaprolactam, sulfolane, n,n'-dimethylacetamide, and 1,3-dimethyl-2-imidazolidinone. Preferably, the polymerization solvent is NMP. In embodiments, in which the polymerization solvent includes NMP, NMP can react with NaOH to form n-methyl-1,4-aminobutanoate ("SMAB").

As noted above, in some embodiments, the reaction components further include a molecular weight modifying agent. The molecular weight modifying agent increases the molecular weight of the PPS polymer, relative to a synthesis scheme not including the molecular weight modifying agent. Preferably, the molecular weight modifying agent is an alkali metal carbonate. Alkali metal carbonates are represented by the formula: $R'CO_2M'$, where R' is selected from the group consisting of a $C_1$ to $C_{20}$ hydrocarbyl group, a $C_1$ to $C_{20}$ hydrocarbyl group and a $C_1$ to $C_5$ hydrocarbyl group; and M' is selected from the group consisting of lithium, sodium, potassium, rubidium or cesium. Preferably M' is sodium or potassium, most preferably sodium. Preferably, the alkali metal carboxylate is sodium acetate.

The polymerization reaction is performed by contacting the reaction components at a reaction temperature selected such that the para-dihalobenzene compound and the sulfur compound polymerize to form the PPS polymer. In some embodiments, the reaction temperature is from 170° C. to 450° C., or from 200° C. to 285° C. The reaction time (time duration of the polymerization reaction) can be from 10 minutes to 3 days or from 1 hour to 8 hours. During the polymerization reaction, the pressure (reaction pressure) is selected to maintain the reaction components in the liquid phase. In some embodiments, the reaction pressure can be from 0 pounds per square inch gauge ("psig") to 400 psig, from 30 psig to 300 psig, or from 100 psig to 250 psig.

The polymerization reaction can be terminated by cooling the reaction mixture to a temperature at which the polymerization reaction ceases. "Reaction mixture" refers to the mixture formed during the polymerization reaction and contains any remaining reaction components, formed PPS polymer and reaction by-products. The cooling can be performed using a variety of techniques known in the art. In some embodiments, the cooling can include liquid quenching. In liquid quenching, a quench liquid is added to the reaction mixture to cool the reaction mixture. In some embodiments, the quench liquid is selected from the group consisting of the polymerization solvent or water or a combination thereof. In some embodiments, the temperature of the quench liquid can be from about 15° C. to 99° C. In some embodiments, the temperature of the quench liquid can be from 54° C. to 100° C. (e.g. in embodiments in which the quench liquid is the solvent) or from 15° C. to 32° C. (e.g. in embodiments in which the quench liquid is water). The cooling can be further facilitated by use of a reactor jacket or coil, to cool the reaction vessel in which the polymerization reaction is performed ("polymerization reactor"). For clarity, termination of the polymerization reaction does not imply that complete reaction of the para-dihalobenzene compound and the sulfur compound. Generally, termination is initiated at a time when the polymerization reaction is substantially complete or when further reaction of the para-dihalobenzene compound and the sulfur compound would not result in a significant increase in average molecular weight of the PPS polymer.

After termination, the PPS polymer is present as a PPS polymer mixture. The PPS polymer mixture includes water, the polymerization solvent, reaction by-products including salts (e.g. sodium chloride and sodium acetate); PPS oligomers (10 or less recurring units of Formula (1), and any unreacted reactants (e.g. solvent, para-dihalobenzene compound, and molecular weight modifying agent) (collectively, "post-reaction compounds"). Generally, after termination, the PPS polymer mixture is present as a slurry, having a liquid phase and a solid phase containing the PPS polymer (precipitates from the solvent during liquid quenching). In some embodiments, the PPS polymer mixture can be present as wet PPS polymer, for example, by filtration of the slurry after termination. The PPS polymer mixture includes the PPS polymer, less than 5 wt. % ionic salts, more than 30 wt. % of the polymerization solvent (e.g. NMP), and more than 0.1 wt. % of the para-dichlorobenzene, relative to the total weight of the PPS polymer mixture. With respect to the ionic salts the concentration of any one of the selected metal cations is less than 100 ppm. PPS polymer synthesis, including polymerization and termination, and recovery, including acid treatment and metal cation treatment, is discussed in US patent application publication number, 2015/0175748 to Fodor et al., filed Dec. 19, 2013 ("the '748 patent") and incorporated by reference herein in its entirety.

Subsequent to termination, the recovery process is implemented. Recovery processes are described in U.S. Pat. No. 5,266,680 to Reed, filed Jun. 24, 1992, and incorporated by reference herein in its entirety. In some embodiments, the selected metal cation can be efficiently incorporated into the PPS polymer at the desired concentration during the recovery process. The recovery process includes a one or more post reaction treatments, where each of the one or more post-reaction treatments includes contacting a PPS polymer mixture with a treatment liquid and, subsequently, removing the treatment liquid. In general, the treatment liquid is selected to help remove one or more of the post-reaction compounds from the PPS polymer, while simultaneously helping to avoid chemical reactions with the end-capping agents. In embodiments in which the selected metal cation is incorporated into the PPS polymer during the recovery process, however, the treatment liquid of at least one of the one or more post reaction treatments is selected to incorporate the selected metal cation into the PPS at the desired concentration. Accordingly, in such embodiments, the treatment liquid of at least one of the one or more post reaction treatments includes the selected metal cation.

Examples of desirable treatment liquids to incorporate the selected metal cation into the PPS polymer include, but are not limited to, calcium acetate, calcium sulfate, calcium sulfite, calcium thiosulfate, calcium perchlorate, calcium chlorate, calcium chlorite, calcium hypochlorite, calcium carbonate, calcium bicarbonate, calcium chloride, calcium bromide, calcium hydroxide, calcium iodide, calcium nitrate, calcium phosphate, calcium pyrophosphate, calcium thiocyanate.

In some embodiments, the contacting comprises washing the PPS polymer mixture, on a filter, with the treatment liquid. During the washing, the treatment liquid is contacted with the PPS polymer mixture, and is subsequently removed as the filtrate, with the treated PPS polymer mixture remaining on filter. In other embodiments, the treatment liquid and PPS polymer mixture can be added together in a vessel and mixed to form a slurry. The treatment liquid can be subsequently removed by decanting the liquid from the slurry, leaving the treated PPS polymer mixture in the vessel. A person of ordinary skill in the art will recognize that after each of the post-reaction treatment, the composition of the PPS polymer mixture changes. In particular, because the liquid treatment helps to remove one or more post-reaction compounds, the concentration of those compounds in the PPS polymer mixture is reduced subsequent to each of the at least one post-reaction treatments and, in some cases, can go below detectable limits. Of course, in embodiments in which the selected metal cation is incorporated into the PPS polymer at the desired concentration during the recovery process, the concentration of the desired metal cation increases after a post-reaction treatment, relative to the concentration of the desired metal cation prior to the post-reaction treatment.

Incorporation of the selected metal cation into the PPS during recover involves at least one post-reaction treatment where the PPS polymer mixture is contacted with a treatment liquid including the selected metal cation. The number of such post reaction treatments is not particularly limited. The person of ordinary skill in the art, based upon the disclosure herein, will know how to select post-reaction treatment parameters, including but not limited to, number of treatments, the selected metal cation concentration within each treatment liquid, and the order of all post-reaction reaction treatments, to obtain the desired selected metal cation concentration, as described above, in the final, dried PPS polymer. With respect to the order of post-reaction treatments (e.g. the order of post-reaction treatments to incorporate the selected metal cation into the PPS polymer and those that do not), while the order is not particularly limited, it is preferable that each of the one or more post-reaction treatments incorporating the selected metal cation into the PPS polymer are implemented consecutively and subsequent to all other post-reaction treatments. Most preferably, the one or more post-reaction treatments incorporating the selected metal cation into the PPS polymer are implemented immediately prior to drying, as described in detail below.

Subsequent to the recovery process, the PPS polymer mixture can be dried. The drying can be performed at any temperature which can substantially dry the PPS polymer mixture, to yield a dried PPS polymer. Desirably, the drying process is selected to help prevent oxidative curing of the PPS polymer. For example, if the drying process is conducted at a temperature of at least 100° C., the drying can be conducted in a substantially non-oxidizing atmosphere (e.g., in a substantially oxygen free atmosphere or at a pressure less than atmospheric pressure, for example, under vacuum). When the drying process is conducted at a temperature less than 100° C., the drying process can be facilitated by performing the drying at a pressure less than atmospheric pressure so the liquid component can be vaporized from the PPS polymer mixture. When the drying is performed at a temperature of less than 100° C., the presence of a gaseous oxidizing atmosphere (e.g. air) generally does not result in a detectable curing of the PPS polymer.

The PPS Polymer Compositions

In some embodiments, the PPS polymer composition includes, in addition to the PPS polymer, a flat glass fiber, an oganic dye or a combination thereof.

Glass fibers are silica-based glass compounds that contain several metal oxides which can be tailored to create different types of glass. The main oxide is silica in the form of silica sand; the other oxides such as calcium, sodium and aluminum are incorporated to reduce the melting temperature and impede crystallization. All glass compositions, including but not limited to, A, C, D, E, M, S, R, T glass fibers (as described in chapter 5.2.3, pages 43-48 of Additives for Plastics Handbook, 2nd ed, John Murphy), or any mixtures thereof or mixtures thereof can be incorporated in the PPS polymer composition. Preferably, the glass fiber is R, S and T glass fibers. R, S and T glass fibers are high modulus glass fibers that have typically an elastic modulus of at least 76, preferably at least 78, more preferably at least 80, and most preferably at least 82 GPa as measured according to ASTM D2343.

Additionally, E, R, S and T glass fibers are well known in the art. They are notably described in Fiberglass and Glass Technology, Wallenberger, Frederick T.; Bingham, Paul A. (Eds.), 2010, XIV, chapter 5, pages 197-225. R, S and T glass fibers are composed essentially of oxides of silicon, aluminium and magnesium. In particular, those glass fibers comprise typically from 62-75 wt. % of $SiO_2$, from 16-28 wt. % of $Al_2O_3$ and from 5-14 wt. % of MgO. To the contrary of the regular E-glass fibers widely used in polymer compositions, R, S and T glass fibers comprise less than 10 wt. % of CaO.

As noted above, the glass fibers of interest herein are flat glass fibers. The term "flat glass fiber" refers to a glass fiber with a noncircular cross-sectional area. Flat glass fiber can be characterized by the aspect ratio, defined as the ratio of the length to the diameter of the glass fiber. For embodiments of interest herein, the flat glass fiber has an aspect ratio of from 1 to 4, from 1 to 3, or from 1 to 2.

In some embodiments, the flat glass fiber concentration in the PPS polymer composition is at least 5 wt. %, at least 10 wt. %, at least 15 wt. %, at least 20 wt. %, at least 25 wt. %, or at least 30 wt. %. Additionally or alternatively, in some embodiments, the flat glass fiber concentration in the PPS polymer is no more than 60 wt. %, no more than 55 wt. %, no more than 50 wt. %, no more than 45 wt. %, or no more than 40 wt. %. In some embodiments, the flat glass fiber concentration in the PPS polymer composition is from 5 wt. % to 60 wt. %, from 10 wt. % to 55 wt. %, from 15 wt. % to 50 wt. %, or from 20 wt. % to 45 wt. %, from 20 wt. % to 45 wt. %, from 20 wt. % to 40 wt. %, or from 25 wt. % to 40 wt. %.

In some embodiments, the PPS polymer composition includes an organic dye. The term "organic dye" refers to carbon-based molecules which absorb visible light with wavelengths of from 390 to 700 nm, therefore imparting color to said dye. Additionally, the organic dyes of interest herein are either IR transparent organic dyes or IR absorbent organic dyes. IR transparent organic dyes have a transmittance of at least 20% at a wavelength within the range 800 nm to 1 mm. IR absorbent organic dyes have a transmittance of no more than 10% within the range 800 nm to 1 mm. Transmittance can be measured as described in the examples.

Examples of IR transparent organic dyes include, but are not limited to anthracene-based dyes, anthraquinone-based dyes and an organic dye such as perylene-based, perinone-based, heterocycle-based, disazo-based and monoazo-based dyes. Examples of IR absorbent organic dyes include, but are not limited to phthalocyanine-based dyes and polymethine-based dyes.

Of course, in some embodiments, the PPS polymer composition includes a plurality of organic dyes. For example, the combination of a blue organic dye, red organic dye and yellow organic dye; the combination of green organic dye, red organic dye and yellow organic dye; the combination of blue organic dye, green organic dye and red organic dye and yellow organic dye; and the combination of green organic dye, violet organic dye and yellow organic dye can be used. Generally, the organic dyes which exhibit blue, violet and green colors can be main components to produce the black dyes.

In some embodiments, the concentration of the organic dye in the PPS polymer composition is at least 0.1 wt. %, at least 0.2 wt. %, at least 0.5 wt. %, or at least 0.7 wt. %. Additionally or alternatively, in some embodiments, the concentration of the organic dye in the PPS polymer composition is no more than 5 wt. %, no more than 4 wt. %, no more than 3 wt. %, or no more than 2 wt. %. In some embodiments, the concentration of the organic dye in the PPS polymer composition is from 0.1 wt. % to 5 wt. %, from 0.2 wt. % to 4 wt. %, from 0.5 wt. % to 3 wt. % or from 0.7 wt. % to 2 wt. %.

Of course, in some embodiments, the PPS polymer composition is free of any organic dye. In such embodiments, the concentration of the organic dye in the PPS polymer composition less than 0.1 wt. %, less than 0.05 wt. % or less than 0.01 wt. %.

In some embodiments, the PPS polymer composition has a transmittance at 980 nm of at at least 25%, at least 27%, at least 28%, at least 29%, or at least 30%. Additionally or alternatively, in some embodiments, the PPS polymer composition has a transmittance at 940 nm of at least 25%, at least 27%, at least 28% or at least 29%. For clarity, where the PPS polymer composition consists essentially of the PPS polymer (total concentration of additional components is less than 0.01 wt. %), the transmittance at 980 nm and 940 nm can be within the respective ranges described above with respect to the PPS polymer. On the other hand, in some embodiments in which the PPS polymer composition includes an IR absorbent organic dye, the transmittance at 980 nm and 940 nm is no more than 10%, no more than 5%, no more than 2%, or no more than 1%. Transmittance can be measured as described in the examples below.

Formation of the PPS Polymer Compositions

The PPS polymer compositions can be made by methods well-known to the person of ordinary skill in the art. Such methods include, but are not limited to, melt-mixing processes. Melt-mixing processes are typically carried out by heating the polymer components above the melting temperature of the thermoplastic polymers thereby forming a melt of the thermoplastic polymers. In some embodiments, the processing temperature ranges from about 280-450° C., preferably from 290° C. to 440° C., from 300° C. to 430° C., or from 310° C. to 420° C. Suitable melt-mixing apparatus are, for example, kneaders, Banbury mixers, single-screw extruders, and twin screw extruders. Preferably, use is made of an extruder fitted with means for dosing all the desired components to the extruder, either to the extruder's throat or to the melt. In some embodiments, the components of the PPS polymer composition, e.g. the PPS polymer, and any additional components, for example the glass fibers and organic pigment, are fed to the melt-mixing apparatus and melt-mixed in that apparatus. The components may be fed simultaneously as a powder mixture or granule mixer, also known as dry-blend, or may be fed separately.

The order of combining the components during melt-mixing is not particularly limited. In one embodiment, the component can be mixed in a single batch, such that the desired amounts of each component are added together and subsequently mixed. In other embodiments, a first sub-set of components can be initially mixed together and one or more of the remaining components can be added to the mixture for further mixing. For clarity, the total desired amount of each component does not have to be mixed as a single quantity. For example, for one or more of the components, a partial quantity can be initially added and mixed and, subsequently, some or all of the remainder can be added and mixed.

Laser Welding PPS Polymer Composition

As explained in detail above, at least in part due to the excellent transparence of the PPS polymer compositions described herein, the PPS polymer compositions can be desirably laser welded.

Laser welding involves the use of an IR light beam to create an adhesive joint between two polymer compositions. In laser welding, a first polymer composition and a second polymer composition are contacted to form an interface between the two polymer compositions ("polymer-polymer interface"). The first polymer composition is transparent (has a transmittance of at least 20% at a wavelength within the range 800 mm to 1 mm) to the light beam and the second polymer composition absorbs (has a transmittance of no more than 10% within the range 800 mm to 1 mm) the light beam. The polymer-polymer interface is irradiated with the light beam by passing the light beam through a portion of the first polymer composition. At the polymer-polymer interface, where the light beam contacts the second polymer composition, the second polymer composition absorbs the light and converts the IR radiation into heat. The generated heat melts the second polymer composition at the location where it is contacted by the light. Additionally, the generated heat is also conducted from the second polymer composition to the first polymer composition, and melts a portion of the first polymer composition. Ultimately a melt, including the first polymer composition and the second polymer composition, is formed. When the light source is subsequently moved (or removed), the melt cools and forms a solid adhesive joint including a blend of the first polymer composition and the second polymer composition.

In embodiments of interest herein the first polymer composition is the PPS polymer composition. The second polymer composition is not particularly limited. In general, the second polymer compositions have a similar melting point to the PPS polymer composition and, preferably, less than or equal to the melting point of the PPS polymer composition. In some embodiments, the second polymer composition is also PPS polymer compositions. In alternative embodiments, the second polymer composition includes a polymer selected from the group consisting of acrylonitrile butadiene styrene, polyamide, polybutylene terephthalate, polycarbonate, polyethylene (high density and low density), poly(ether ether ketone), poly(ether sulfone), polyoxymethylene, polytetrafluoroethylene, and thermoplastic elastomer.

In some embodiments, the IR light beam is passed through the PPS polymer composition prior to irradiating the polymer-polymer interface. In such embodiments, the IR light beam is absorbed by the second polymer composition to form the joint as described above. Of course, the second polymer composition has sufficient IR absorption to desirably form a joint with the second polymer composition. If the PPS polymer composition includes an organic dye, the organic dye is selected to be an IR transparent organic dye, to avoid undesirable amounts of IR absorbance by the PPS polymer compositions. Of course, if the second polymer composition is also a PPS polymer composition as described herein, the PPS polymer includes an IR absorbent organic dye, such that the second polymer composition absorbs a desirable amount of IR light to form the joint. In alternative embodiments, the IR light beam is passed through the second polymer composition prior to irradiating the polymer-polymer interface. In such embodiments, the PPS polymer composition includes an IR absorbent organic dye to provide for desirable amounts of IR absorption from the PPS polymer composition. Of course, the second polymer composition has sufficient IR transparency to allow for the formation of a desirable joint (e.g. to allow a desirable amount of IR light to contact the polymer-polymer interface). In embodiments where the second polymer composition is a PPS polymer composition as described herein, if the PPS polymer composition includes an organic dye, it is an IR transparent organic dye.

The form of the joint is not particularly limited. Specific joint geometries can be obtained by moving the IR light beam according to a pattern over the polymer-polymer interface. In such embodiments, the ultimately formed joint has the geometry of the pattern. Based upon the disclosure herein, the person of ordinary skill in the art will know how to adjust laser parameters including, but not limited to, duty cycle and movement rate to obtain a joint with desirable strength.

The welded joint can be incorporated into various articles and are particularly desirable in application settings in which the mechanical strength, heat resistance, and chemical resistance of the PPS polymer composition can be leveraged to provide improved performance. In one example, the welded joint can be incorporated into an automotive component. Under the hood automotive components are particularly desirable application settings for PPS polymer compositions, due to the high heat, high stress, and highly corrosive environment. Other examples of articles incorporating the welded joint include mobile electronic device components, aerospace components, filter components (e.g. fabrics), electrical insulation components, membrane components and gasket components.

EXAMPLES

The examples demonstrate the optical and mechanical performance of the PPS polymers and PPS polymer compositions.

The PPS polymers were synthesized according to the following scheme. To a 1 L titanium reactor was added 27.20 g NaOH pellets (0.680 moles), 18.05 g (0.220 moles) sodium acetate, 62.83 g NaSH-hydrate (59.49 wt. % NaSH, 0.6667 moles NaSH), and 167 g n-methylpyrrolidone ("NMP"). The reactor was sealed, pressured/vented five times with nitrogen (92 psig), stirred at 320 rpm, and warmed to 150° C. over 45 minutes. Meanwhile, 98.00 g 1,4-dichlorobenzene ("DCB") (0.667 moles) and 50 g NMP were added to a 300 mL stainless steel addition vessel wrapped in heating tape. The addition vessel was pressurized and vented with nitrogen five times, pressurized with nitrogen to 90 psig, and then heated to 100° C. to completely melt the DCB. After the internal reactor temperature reached 150° C. and the pressure reached 40 psig, the reactor was vented slowly and a clear condensate collected. A small stream of nitrogen was added to the reactor to help remove the water. After 40 minutes, 28 g condensate was collected and the internal reactor temperature reached 200° C. The condenser was removed, the nitrogen flow stopped, and the contents of the warm DCB addition vessel (~120 pisg) added to the reactor. The addition vessel was removed, opened, and 25 mL NMP added. The vessel was pressurized and vented three times with nitrogen, pressurized with nitrogen to 90 psig, and the NMP rinse added to the reactor. The reactor was sealed and warmed to 240° C. over 20 minutes.

After two hours at 240° C., the temperature was raised to 265° C. over 30 minutes, and the reactor maintained at 265° C. for an additional 2 hours. The final pressure was 140 psig. The heater was lowered, the agitator speed reduced to 120 rpm and the reactor contents cooled at 1.6° C./min over one hour. The stirrer was stopped and the reactor allowed to cool to ambient temperature.

The reactor (~15 psig) was then vented and opened. The thick off-white slurry (reaction mixture) was removed from the reactor and placed in a 3 L stainless steel beaker with a large PTFE-coated magnetic stir bar. 200 mL NMP was added to the slurry, the mixture stirred and warmed to 80° C. The slurry was then filtered while warm through a 600 mL medium porosity sintered glass filter to give a clear yellow filtrate and off-white solid (salts and polymer). The filter cake was washed once with 100 mL warm NMP and the NMP-wet solids transferred back to the stainless steel beaker with 300 mL 80° C. deionized ("DI") water. The slurry was stirred for 15 minutes and the milky supernatant decanted into a 3 L plastic beaker. The remaining coarse solid was washed an additional two times in the same way. For the last two washes, 1.2 g calcium acetate was added to the slurry (to increase the selected metal cation concentration to at least 400 ppm). The slurry was stirred for 15 minutes and the supernatant was decanted. The supernatant was nearly clear after the final wash. The coarse polymer was then isolated by filtration and washed on the filter with hot DI water three times. The solid was then dried in a vacuum oven overnight at 90-100° C./26" Hg with a small stream of nitrogen to give 62 g (86% yield) of coarse white polymer.

The PPS polymer composition samples were prepared by melt blending the ingredients listed below in a 26 mm twin screw extruder (ZSK 26 by Coperion) operating at about 300° C. barrel setting using a screw speed of about 200 rpm, a throughput of 15 kg/hour and a melt temperature of about 330° C. The glass fiber and other additional components were added to the melt through a screw side feeder. The components of the PPS polymer compositions were as follow:

- Silane (Coupling Agent): commercially obtained as Silquest A-187® from Momentive Performance Materials Inc.
- Round Glass Fiber: commercially obtained as T-779H from Nippon Electric Glass
- Flat Glass Fiber: commercially obtained as CSG 3PA-820, commercially obtained from Nittobo having an aspect ratio of 1:4.
- Organic Dye 1: Black laser dye commercially obtained from Clariant.
- Organic Dye 2: Black IR transparent dye commercially obtained as Ebind® LTW-8400C from Orient Chemical Industries Co., Ltd.
- Organic Dye 3: Black IR absorbent dye commercially obtained as Ebind® LAW-4800 from Orient Chemical Industries Co., Ltd.

The calcium ion concentration in the PPS polymer and PPS polymer compositions was measured using ICP-OES as follows: A clean, dry platinum crucible was placed onto an analytical balance, and the balance was zeroed. One half to three gram of PPS polymer sample was weighed into the boat and weight was recorded to 0.0001 g. The crucible with sample was placed in the muffle furnace (Thermo Scientific Thermolyne F6000 Programmable Furnace) and the door was closed. The furnace was gradually heated to 525° C. The sample was dry ashed at that temperature for 10 hrs. When the ashing cycle was completed and the furnace cooled down to room temperature, the crucible was taken out of the furnace and placed in a fume hood. The ash was dissolved in diluted hydrochloric acid. The solution was transferred to a 25 mL volumetric flask, using a polyethylene pipette. The crucible was rinsed twice with approximately 5 mL of ultrapure water (R<18 megohm-centimeter ("MΩcm"), where R is the electrical resistivity) and these washes were added to the volumetric flask to effect a quantitative transfer. Ultrapure water was added to the mark of 25 mL flask. A stopper was put on the top of the flask and the content was shaken well to mix.

ICP-OES analysis was performed using inductively-coupled plasma emission spectrometer Perkin-Elmer Optima 8300 dual view. The spectrometer was calibrated using a set of NIST traceable multi-element mixed standards with analyte concentration between 0.0 and 10.0 mg/L. A linear calibration curve was obtained in a whole range of concentrations with a correlation coefficient better than 0.9999 for each of 48 analytes. The standards were run before and after every ten samples to ensure instrument stability. The results were reported as an average of three replicates. The concentration of each elemental impurity in the sample was calculated with the following equation: $A = E*(B*C)/D$, where A is the end-capping agent concentration in the sample in μeq, B is the end-capping agent concentration of in the solution analyzed by ICP-OES in mg/L, C is the volume of the solution analyzed by ICP-OES in mL and D is the sample weight in grams used in the procedure. For the analysis of calcium end-capping agents, E is (1/40).

Transmittance was measured as follows. Samples were molded into plaques having the following dimensions: 60 mm×60 mm×2 mm. Transmittance was measured at 980 nm and 940 nm using a Perkin Elmer Lambda 950 spectrophotometer. Results are reported in percent transmittance.

Example 1: Effect of Ion Concentration on IR Transmittance PPS Polymer Compositions The present example demonstrates that effect of ion concentration on the transmittance of PPS polymer compositions.

To demonstrate the effect of ion concentration, 5 PPS polymer compositions were formed. Samples E1 to E3 were formed as described above (with calcium acetate washing to increase the selected metal ion concentration). Samples CE1 and CE2 were also formed as described above, however, they employed a water wash (CE1) and acid wash (CE2) in place of the calcium acetate wash. For each sample, transmittance at 940 nm and 980 nm was tested. Table 1 displays the sample parameters for each of the samples tested. As used herein, "CE" denotes a comparative example and "E" denotes an example embodiment according to the present description.

TABLE 1

| Sample | | CE1 | CE2 | E1 | E2 | E3 |
|---|---|---|---|---|---|---|
| Calcium Ion Concentration (ppm) | | 52 | 56 | 626 | 635 | 616 |
| % T | 980 nm | 32 | 36 | 38 | 39 | 41 |
| | 940 nm | 29 | 37 | 36 | 40 | 43 |

Referring to Table 1, for the samples tested, PPS polymer compositions having a calcium ion concentration of at least 400 ppm generally had increased transmittance at both 980 nm and 940 nm, relative to PPS polymer compositions having a calcium ion concentration of less than 400 ppm. At 980 nm, samples 1 to 3 had increased transmittance relative to both CE1 and CE2. At 940 nm, samples 1 to 3 had increased transmittance relative to both CE1, and samples 2 and 3 had increased transmittance relative to CE2.

Example 2: Effect of Reinforcing Fillers and Compatibilizers on IR Transmittance of PPS Polymer Compositions The present example demonstrates the effect of glass fiber type and silane on the transmittance and mechanical performance of PPS polymer compositions.

To demonstrate the effect of glass fiber, 4 samples were formed as described above, using calcium acetate washing to increase the calcium content of the PPS. For samples E4, E5, and E7 silane was added as a coupling agent. Additionally, sample E4 was formed with round glass fiber (T-779H, commercially obtained from Nippon Electric Glass) and samples E5 to E7 were formed with flat glass fiber (CSG3PA-820, commercially obtained from Nittobo).

Initial mechanical tensile properties, stress at break (tensile strength) and strain at break (elongation at break), were measured according to ISO 527-2/1A and are reported in Table 2. Measurements were made on injection molded ISO tensile bars. Mold temperature for the test specimen ranged from 135-150° C. and melt temperature ranged from 300-340° C. The thickness of the test bars was 4 mm and their width was of 10 mm. According to ISO 527-2/1A, the tensile strength and elongation were determined at a testing speed of 5 mm/min.

TABLE 2

| Sample Number | CE4 | E5 | E6 | E7 |
|---|---|---|---|---|
| Composition | | | | |
| PPS (wt. %) | 69.5 | 69.5 | 70 | 59.5 |
| Calcium Ion Concentration (ppm) | 635 | 635 | 635 | 616 |
| Round Glass Fiber (wt. %) | 30 | | | |
| Flat Glass Fiber (wt. %) | | 30 | 30 | 40 |
| Silane Coupling Agent (wt. %) | 0.5 | 0.5 | | 0.5 |
| Mechanical Performance | | | | |
| Impact Strength at Break (kJ/m$^2$) | 9.58 | 10.26 | 9.7 | 12.3 |
| Chord Modulus from 0.05% to 0.25% (MPa) | 11700 | 11900 | 11700 | 15500 |
| Tensile Stress at Break (MPa) | 162 | 157 | 148 | 176 |
| Tensile Strain at Break (%) | 2 | 1.8 | 1.7 | 1.5 |
| Optical Performance | | | | |
| % T 980 nm | 24 | 28 | 28 | 26 |
| 940 nm | 23 | 27 | 29 | 26 |

Referring to Table 2, for the samples tested, it was surprisingly found that the samples including silane had increased mechanical performance without a detrimental effect on the transmittance at 980 nm. For example, comparison of sample E5 with sample E6 demonstrates that the addition of the silane compatibilizer (E5) surprisingly resulted in improved mechanical performance without any appreciable detrimental effect on the transmittance at 980, though the transmittance at 940 was slight lower when the silane compatibilizer was present. Furthermore, comparison of sample CE4 with sample E5 demonstrates that the PPS polymer compositions including flat glass fiber (E5) had suprisingly improved transmittance at 980 nm and 940 nm, as well as improved impact strength, relative to the corresponding PPS polymer composition including round glass fibers (E4). Still further, sample E7 demonstrates that even at glass fiber concentrations of 40 wt. %, the PPS polymer composition still has excellent transmittance at 980 nm 940 nm, as well as significantly improved impact performance.

Example 3: Effect of Melt Flow Rate on Transmittance

The present example demonstrates the effect of melt flow rate on the transmittance of PPS polymer compositions.

To demonstrate the effect of melt flow rate, 3 samples were formed as described above. Table 3 displays the sample parameters.

TABLE 3

| Sample Number | E8 | E9 | E10 |
|---|---|---|---|
| Composition | | | |
| PPS (wt. %) | 70 | 70 | 70 |
| Calcium Ion Concentration (ppm) | 625 | 635 | 616 |
| Glass Fiber (wt. %) | 30 | 30 | 30 |
| Mechanical Performance | | | |
| Impact Strength at Break (kJ/m$^2$) | 9.66 | 9.7 | 9.76 |
| Chord Modulus from 0.05% to 0.25% (MPa) | 11700 | 11700 | 11800 |
| Tensile Stress at Break (MPa) | 151 | 148 | 151 |
| Tensile Strain at Break (%) | 1.7 | 1.7 | 1.6 |
| Rheological Performance | | | |
| Melt Flow Rate (g/10 min) | 42.66 | 30.8 | 63 |
| Optical Performance | | | |
| % T 980 nm | 29 | 28 | 28 |
| 940 nm | 30 | 29 | 29 |

Referring to Table 3, over a significant range of melt flow rates, the percent transmittance of samples E8 to E10 unexpectedly remain within about 3% to 3.5% of each other.

Example 4: Effect of Organic Dyes on Transmittance

The present example demonstrates the effect of organic dyes on the transmittance of PPS polymer compositions.

To demonstrate the effect of organic dyes, 7 samples were formed as described above. Sample parameters and results of testing are displayed in Table 4.

TABLE 4

| Sample Number | E11 | E12 | E13 | E14 | E15 | CE16 | CE17 |
|---|---|---|---|---|---|---|---|
| Composition | | | | | | | |
| PPS (wt. %) | 68.5 | 68.5 | 68.5 | 69.5 | 69.5 | 69.5 | 69.5 |
| Calcium Ion Concentration (ppm) | 616 | 616 | 616 | 616 | 616 | 616 | 616 |
| Flat Glass Fiber (wt. %) | 30 | 30 | 30 | 30 | 30 | | |
| Round Glass Fiber (wt. %) | | | | | | 30 | 30 |
| Silane (wt. %) | 0.5 | 0.5 | 0.5 | 0.5 | 0.5 | 0.5 | 0.5 |
| Organic Dye 1 (wt. %) | | | | 1 | | | |
| Organic Dye 2 (wt. %) | 1 | | | | | | |
| Organic Dye 3 (wt. %) | | 1 | | | | | |
| Mechanical Performance | | | | | | | |
| Impact Strength at Break (kJ/m$^2$) | 9.69 | 9.72 | 9.83 | 9.76 | 10.1 | 9.45 | 8.75 |
| Chord Modulus from 0.05% to 0.25% (MPa) | 11700 | 11600 | 11500 | 11900 | 11600 | 11200 | 11400 |

TABLE 4-continued

| Sample Number | | E11 | E12 | E13 | E14 | E15 | CE16 | CE17 |
|---|---|---|---|---|---|---|---|---|
| Tensile Stress at Break (MPa) | | 151 | 156 | 156 | 154 | 157 | 161 | 159 |
| Tensile Strain at Break (%) | | 1.6 | 1.7 | 1.7 | 1.7 | 1.9 | 2.1 | 1.8 |
| Optical Performance | | | | | | | | |
| % T | 980 nm | 30 | 1 | 28 | 30 | 29 | 25 | 26 |
| | 940 nm | 29 | 1 | 26 | 29 | 28 | 24 | 25 |

Referring to Table 4, samples including an IR transparent organic dye had similar optical performance to the sample that was free of the IR transparent organic dye. For example, sample E11 (IR transparent organic dye) and sample E14 (no IR transparent dye) had identical transmittance, demonstrating that imparting the black color to the PPS polymer composition (as desired in, but not limited to, automotive and mobile electronic device application) did not appreciably affect optical performance. On the other hand, comparison of sample E12 (IR absorbent organic dye) with sample E14 demonstrates that excellent IR absorption (low IR transmittance) when an IR absorbent organic dye is used.

Further Inventive Concepts

1. A PPS polymer compositions comprising a PPS polymer having a metal cation selected from the group consisting of Al, Ba, Ca, K, and Mg, preferably Al, Ba, Ca, K, and Mg, most preferably Ca, and any combination of one or more, wherein the concentration of the metal cation is at least 400 ppm and no more than 1000 ppm.

2. The PPS polymer composition of inventive concept 1, wherein the PPS polymer further comprises at least 5 wt. %, preferably at least 15 wt. %, more preferably at least 20 wt. %, most preferably at least 25 wt. % of a flat glass fiber.

3. The PPS polymer composition of inventive concept 2, wherein the PPS polymer comprises no more than 60 wt. %, preferably no more than 55 wt. %, more preferably no more than 50 wt. %, still more preferably no more than 45 wt. %, most preferably no more than 40 wt. % of the flat glass fiber.

4. The PPS polymer composition of any one of inventive concepts 1 to 3, wherein the PPS polymer composition has a transmittance, at 980 nm, of at least 25%, at least 27%, at least 28%, at least 29% or at least 30%.

5. The PPS polymer composition of any one of inventive concepts 1 to 4, wherein the PPS polymer composition has a transmittance, at 940 nm, of at least 25%, at least 27%, at least 28%, at least 29% or at least 30%.

6. The PPS polymer composition of any one of inventive concepts 1 to 5, wherein the PPS polymer compositions further comprises an IR transparent dye or an IR absorbing dye.

7. A method of laser welding an interface to form joint, the method comprising
    irradiating a polymer-polymer interface with an infrared ("IR") light beam, wherein
    the polymer-polymer interface comprises the PPS polymer composition of any one of inventive concepts 1 to 6 in contact with a second polymer composition; and
    the irradiating forms a joint comprising the PPS polymer composition and the second polymer composition.

8. The method of inventive concept 7, wherein the IR light beam passes through the PPS polymer composition prior to irradiating the polymer-polymer interface;

9. The method of either inventive concept 7 or 8, wherein the PPS polymer composition comprises an IR transparent dye.

10. The method inventive concept 9, wherein the IR transparent dye is a black organic dye.

11. The method of inventive concept 7, wherein
    the IR light beam passes through the second polymer composition prior to irradiating the polymer-polymer interface and
    the PPS polymer composition comprises an IR absorbing dye.

12. The method of inventive concept 11, wherein the IR absorbing dye is a black organic dye.

13. The method of inventive concepts 7 to 12, wherein the second polymer composition comprises a polymer selected from the group consisting of acrylonitrile butadiene styrene, polyamide, polybutylene terephthalate, polycarbonate, polyethylene (high density and low density), poly(ether ether ketone), poly(ether sulfone), polyoxymethylene, polytetrafluoroethylene, and thermoplastic elastomer.

The embodiments above are intended to be illustrative and not limiting. Additional embodiments are within the inventive concepts. In addition, although the present invention is described with reference to particular embodiments, those skilled in the art will recognized that changes can be made in form and detail without departing from the spirit and scope of the invention. Any incorporation by reference of documents above is limited such that no subject matter is incorporated that is contrary to the explicit disclosure herein.

The invention claimed is:

1. A method of laser welding an interface to form a joint, the method comprising
    irradiating a polymer-polymer interface with an infrared ("IR") light beam, wherein
    the polymer-polymer interface comprises a polyphenylene sulfide ("PPS") polymer composition in contact with a second polymer composition;
    the PPS polymer composition comprises a metal cation selected from the group consisting of Al, Ba, Ca, K, Mg and any combination of one or more thereof;
    the PPS polymer composition comprises at least 25 wt. % of a flat glass fiber;
    the concentration of the metal cation is at least 400 ppm and no more than 1,000 ppm; and
    the irradiating forms a joint comprising the PPS polymer composition and the second polymer composition.

2. The method of claim 1, wherein
    the IR light beam passes through the second polymer composition prior to irradiating the polymer-polymer interface and
    the PPS polymer composition comprises an IR absorbing dye.

3. The method of claim 2, wherein the IR absorbing dye is a black organic dye.

4. The method of claim 3, wherein the second polymer composition is a second PPS polymer composition.

5. The method of claim 4, wherein the second PPS polymer compositions comprises:
- a second metal cation selected from the group consisting of Al, Ba, Ca, K, Mg and any combination of one or more thereof, preferably Ca, K and Mg and any combination of one or more thereof and
- an IR transparent dye; and
- wherein the concentration of the second metal cation is at least 400 ppm.

6. The method of claim 1, wherein the PPS polymer composition comprises an infrared ("IR") transparent dye.

7. The method of claim 6, wherein the IR transparent dye is a black organic dye.

8. The method of claim 1, wherein the IR light beam comprises light at a wavelength of from 900 nm to 1000 nm.

9. The method of claim 1, wherein the metal cation is Ca.

10. The method of claim 1, wherein the IR light beam passes through the PPS polymer composition prior to irradiating the polymer-polymer interface.

11. The method of claim 1, wherein the PPS polymer composition is free of an organic dye.

12. The method of claim 1, wherein the metal cation is selected from the group consisting of Ca, K, and Mg, and any combination of one or more thereof.

* * * * *